United States Patent [19]

Zannucci et al.

[11] 4,305,719
[45] Dec. 15, 1981

[54] STABLE DYED POLYESTER MATERIAL

[75] Inventors: Joseph S. Zannucci; Bobby J. Sublett; Wayne P. Pruett, all of Kingsport, Tenn.

[73] Assignee: Eastman Kodak Company, Rochester, N.Y.

[21] Appl. No.: 162,704

[22] Filed: Jun. 25, 1980

[51] Int. Cl.³ .................... C09B 1/00; C08L 67/00
[52] U.S. Cl. ........................... 8/662; 8/675; 8/922; 260/40 R
[58] Field of Search ................ 8/662, 922, 675; 260/40 R

[56] References Cited

U.S. PATENT DOCUMENTS 3,779,993 12/1973 Kibler et al. ............... 260/40 R

Primary Examiner—A. Lionel Clingman
Attorney, Agent, or Firm—Donald W. Spurrell; Daniel B. Reece, III

[57] ABSTRACT

Disclosed is copolyester material dyed with at least one azo or anthraquinone type dye, said copolyester material having an inherent viscosity of at least 0.4 and containing in copolymerized form from about 0.3 to about 5.0% by weight of one or more of the stabilizing moieties having the general formula

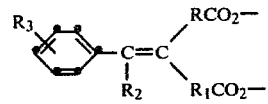

where R and $R_1$ are each a chemical bond or an alkylene group of 1-6 carbons; $R_2$ is alkyl, cycloalkyl, or aryl; $R_3$ represents 1-5 groups each independently selected from H, Cl, F, alkyl, cycloalkyl, alkoxy, aryl or aryloxy; wherein all of the above alkyl and alkylene moieties comprising or being part of the $R_2$ or $R_3$ groups contain from 1-8 carbons, and wherein all of the above alkyl, alkylene, aryl and cycloalkyl moieties may be substituted with up to three of a variety of substituents such as halogen, alkyl of 1-8 carbons, alkoxy of 1-8 carbons, aryl, cycloalkyl and CN.

4 Claims, No Drawings

STABLE DYED POLYESTER MATERIAL

This invention concerns novel stabilized polyester-dye compositions wherein the dyes as well as the polymer show markedly improved fastness to light.

A considerable amount of research has been devoted to developing dyes having improved lightfastness on polyester fibers. A complete line of dyes suitable for applications such as automotive fabrics, has not, however, been forthcoming if one is to consider the light fading propensities of such fabrics. Also, there are a number of disclosures on improving dye lightfastness by dyeing ultraviolet light stabilizers onto the fibers, but this approach finds only limited success. Applicants have now discovered that dyes develope exceptionally good lightfastness on polyester material which contain copolymerized p-methoxybenzylidenemalonate or homologous moieties in a concentration by weight of the polyester of from about 0.1 to about 5.0%, preferably from about 0.5 to about 1.5%.

The copolymerizable moieties have the general formula

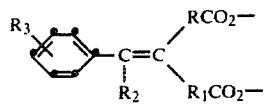

where R and $R_1$ are each alkylene of 1-6 carbons; $R_2$ is alkyl, cycloalkyl, or aryl; $R_3$ represents 1-5 groups each independently selected from H, Cl, F, alkyl, cycloalkyl, alkoxy, aryl or aryloxy; wherein all of the above alkyl and alkylene moieties comprising or being part of the $R_2$ or $R_3$ groups contain from 1-8 carbons; and wherein all of the alkyl, alkylene, aryl and cycloalkyl moieties throughout this specification may be substituted with up to three substitutents which do not interfere with the copolymerization or adversely effect the chemical or physical properties of the polyester, including substituents such as halogen, alkyl of 1-8 carbons, alkoxy of 1-8 carbons, aryl, cycloalkyl, CN, and the like. A highly effective and preferred stabilizing moiety has the structure

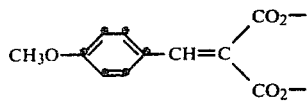

The polyesters into which the present stabilizer moiety are incorporated are prepared by reaction conditions well known in the art. These polyesters may be homopolyesters or copolyesters prepared by reacting a dibasic acid (or ester) or mixtures thereof with aliphatic glycols or glycol mixtures as disclosed, for example, in U.S. Pat. No. 3,779,993 at Column 3. Such dibasic acids are, for example: terephthalic, isophthalic, p,p-sulfonyldibenzoic, 1,2- or 1,3- or 1,4-cyclohexanedicarboxylic, 1,4- or 1,5- or 2,7- or 2,6-naphthalenedicarboxylic, 4,4'-diphenic, 4,4'-benzophenonedicarboxylic, and the like. The glycols are, for example, polymethylene glycols containing 2 to 10 carbon atoms such as ethylene glycol, 1,2- or 1,3-propanediol, 1,2- or 1,3- or 1,4-cyclohexanedimethanol, neopentyl glycol, 1,5- or 2,4-pentanediol, 1,6- or 2,5-hexanediol, 1,3- or 2,3- or 1,4-butanediol, 2,2,4,4-tetramethylcyclobutane-1,3-diol and the like. Also, modifying amounts, i.e., up to about 40 mole % of various acids such as p-hydroxybenzoic, adipic, and sebacic, and ether glycols such as diethylene glycol, poly(ethylene gycol), poly(propylene glycol), and poly(butylene glycol) may be added. Such polyesters may be amorphous or crystalline, they must be able to be formed into films, sheets, or molded objects, preferably have an ASTM (D648-56) 264 psi heat deflection temperature of >60° C., and have an inherent viscosity of at least about 0.4 and preferably between about 0.4 and about 1.6 when measured at 25° C. using 0.5 grams of polymer per 100 milliliter of a solvent consisting of 60 volumes of phenol and 40 volumes of tetrachloroethane. Preferred such polyester moldable compositions are, for example, predominantly poly(ethylene terephthalate), poly(tetramethylene terephthalate), poly(1,4-cyclohexylenedimethylene terephthalate), and the like.

A typical copolyester preparation in which the stabilizer is copolymerized into the polymer chain is carried out as follows: 94.79 grams (0.4886 moles) of dimethyl terephthalate, 87.0 grams (1.4 moles) of ethylene glycol, 10.49 g (0.0729 moles) of 1,4-cyclohexanedimethanol, 1.1 g (0.0044 moles) of dimethyl-p-methoxybenzylidenemalonate, 1 ml of n-butanol solution of titanium tetraisopropoxide which is 0.75% titanium, and 1 ml of an ethylene glycol solution containing 1.1% by weight of commercial Zonyl A, were weighed into a 500 ml single-neck round-bottom flask equipped with a nitrogen inlet, a stirrer, a vacuum outlet and a condensing flask. The flask was heated at 200° C. in a metal bath for 3 hrs. with a nitrogen sweep over the reaction mixture. When the theoretical amount of methanol had distilled from the reaction mixture the metal bath temperature was increased to 280° C. and the pressure in the flask reduced to 0.5 mm of Hg for 1 hr. and 15 minutes. The flask was then removed from the metal bath and allowed to cool to room temperature under reduced pressure. The inherent viscosity of this polymer was about 0.76.

The following table give further specific examples of stabilizing moieties useful in the present invention.

| R | $R_1$ | $R_2$ | $R_3$ |
|---|---|---|---|
| H | H | —$CH_3$ | 2-Cl |
| —$CH_2$— | —$CH_2$— | H | 3-$OCH_3$ |
| —$CH_2$— | —$CH_2$— | —$C_6H_{11}$ | H |
| —$CH_2CH_2CH_2$— | —$CH_2CH_2$— | —$C_6H_5$ | H |
| —$CH_2CH_2$— | H | H | 2,6-di-$CH_3$ |
| H | H | H | 2-$OC_6H_5$ |
| H | H | H | H |
| H | H | —$CH_3$ | H |
| H | H | —$CH_3$ | H |
| H | H | —$CH_2CH_2Cl$ | 2-$CH_2OC_2H_5$ |

The dyes which show marked improvement in light fastness in accordance with the present invention are azo dyes and anthraquinone dyes in general, such as are widely known to the art and exemplified in part by a number of disclosures such as U.S. Pat. Nos. 2,746,952; 2,746,953; 2,757,173; 2,763,668; 2,771,466; 2,773,054; 2,777,863; 2,785,157; 2,790,791; 2,798,081; 2,805,218; 2,822,359; 2,827,450; 2,832,761; 2,852,504; 2,857,371; 2,865,909; 2,871,231; 3,072,683; 3,079,373; 3,079,375;

3,087,773; 3,096,318; 3,096,322; 3,236,843; 3,254,073; 3,349,075; 3,380,990; 3,386,990; 3,394,144; 3,804,823; 3,816,388; 3,816,392; 3,829,410; 3,917,604; 3,928,311; 3,980,626; 3,998,801; 4,039,522; 4,052,379; and 4,140,683. A preferred group of dyes have the structures shown in Table 2 below. The dyeings according to the present invention can be obtained by conventional techniques and at any strength, e.g., 0.1 to 5.0% owf (on weight of fabric). The dyes of Table 2 were compared for fading on modified and unmodified polyester and the results are given in Table 3.

TABLE 2

Stability of Selected Dyes on Poly(ethylene terephthalate) Fibers Containing p-Methoxy-benzylidenemalonate Groups

TABLE 3

| Fiber[2] | Dye 0.5% owf | Gray Scale Rating[1] (AATCC Fading Units) |
|---|---|---|
| A | I | 2.5 (140) |
| B | I | 4.0 (140) |
| A | II | 3.0 (220) |
| B | II | 4.0 (220) |
| A | III | 3.5 (220) |
| B | III | 4.0 (220) |
| A | IV | 3.0 (60) |
| B | IV | 4.0 (60) |
| A | V | 4.0 (60) |
| B | V | 5.0 (60) |
| A | VI | 3.0 (60) |

TABLE 3-continued

| Fiber[2] | Dye 0.5% owf | Gray Scale Rating[1] (AATCC Fading Units) |
|---|---|---|
| B | VI | 4.0 (60) |

[1]Dyes faded following AATCC Test Method 16E.
[2]Fiber A = poly(ethylene terephthalate).
Fiber B = poly(ethylene terephthalate) of Fiber A containing 1% copolymerized p-methoxy-benzylidenemalonate groups.

The invention has been described in detail with particular reference to preferred embodiments thereof, but it will be understood that variations and modifications can be effected within the spirit and scope of the invention.

We claim:

1. Copolyester material dyed with at least one azo or anthraquinone type dye, said copolyester material having an inherent viscosity of at least 0.4 and containing in copolymerized form from about 0.3 to about 5.0% by weight of one or more of the stabilizing moieties having the general formula

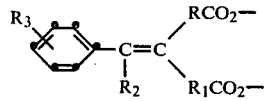

where R and $R_1$ are each a chemical bond or an alkylene group of 1–6 carbons; $R_2$ is alkyl, cycloalkyl, or aryl; $R_3$ represents 1–5 groups each independently selected from H, Cl, F, alkyl, cycloalkyl, alkoxy, aryl or aryloxy; wherein all of the above alkyl and alkylene moieties comprising or being part of the $R_2$ or $R_3$ groups contain from 1–8 carbons, and wherein all of the above alkyl, alkylene, aryl and cycloalkyl moieties may be substituted with up to three substituents selected from halogen, alkyl of 1–8 carbons, alkoxy of 1–8 carbons, aryl, cycloalkyl and CN.

2. The copolyester according to claim 1 wherein the stabilizing moiety has the structure

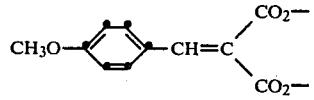

3. The copolyester according to claim 2 wherein the dibasic acid is selected from one or both of terephthalic and 1,2-, 1,3- or 1,4-cyclohexanedicarboxylic, and may include up to about 40 mole % of a modifying acid selected from adipic, sebacic, p,p'-sulfonyldibenzoic, p-hydroxybenzoic, 1,4-, 1,5-, 2,7- or 2,6-naphthalenedicarboxylic, 4,4'-diphenic or 4,4'-benzophenonedicarboxylic and the glycols are selected from one or more of ethylene glycol, 1,2- or 1,3-propanediol, 1,2- or 1,3- or 1,4-cyclohexanedimethanol, neopentyl glycol, 1,5- or 2,4-pentanediol, 1,6- or 2,5-hexanediol, 1,3-, 2,3- or 1,4-butanediol and 2,2,4,4-tetramethylcyclobutane-1,3-diol and may contain up to about 40 mole % of one or more of diethylene glycol, poly(ethylene glycol), poly(propylene glycol), and poly(butylene glycol).

4. The copolyester of claim 3 wherein the principal polyester comprises in a molar ratio of from about 4/1 to about 1/4, ethylene/1,4-cyclohexylenedimethylene terephthalate, and the dye is selected from those of the formulae:
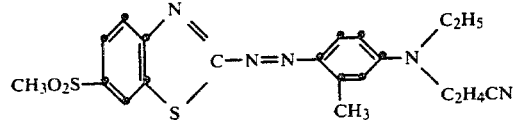
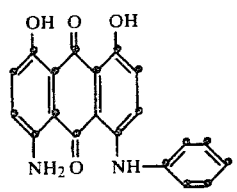
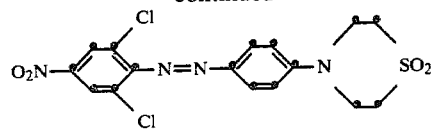
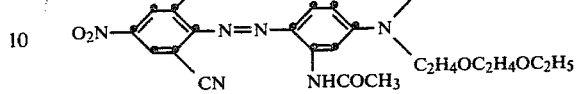
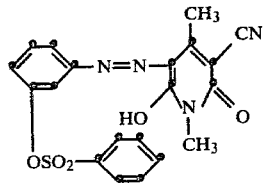
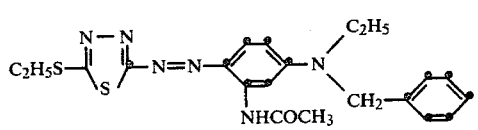
* * * * *